(No Model.)
W. B. THOMAS.
POST HOLDER.
No. 349,240. Patented Sept. 14, 1886.
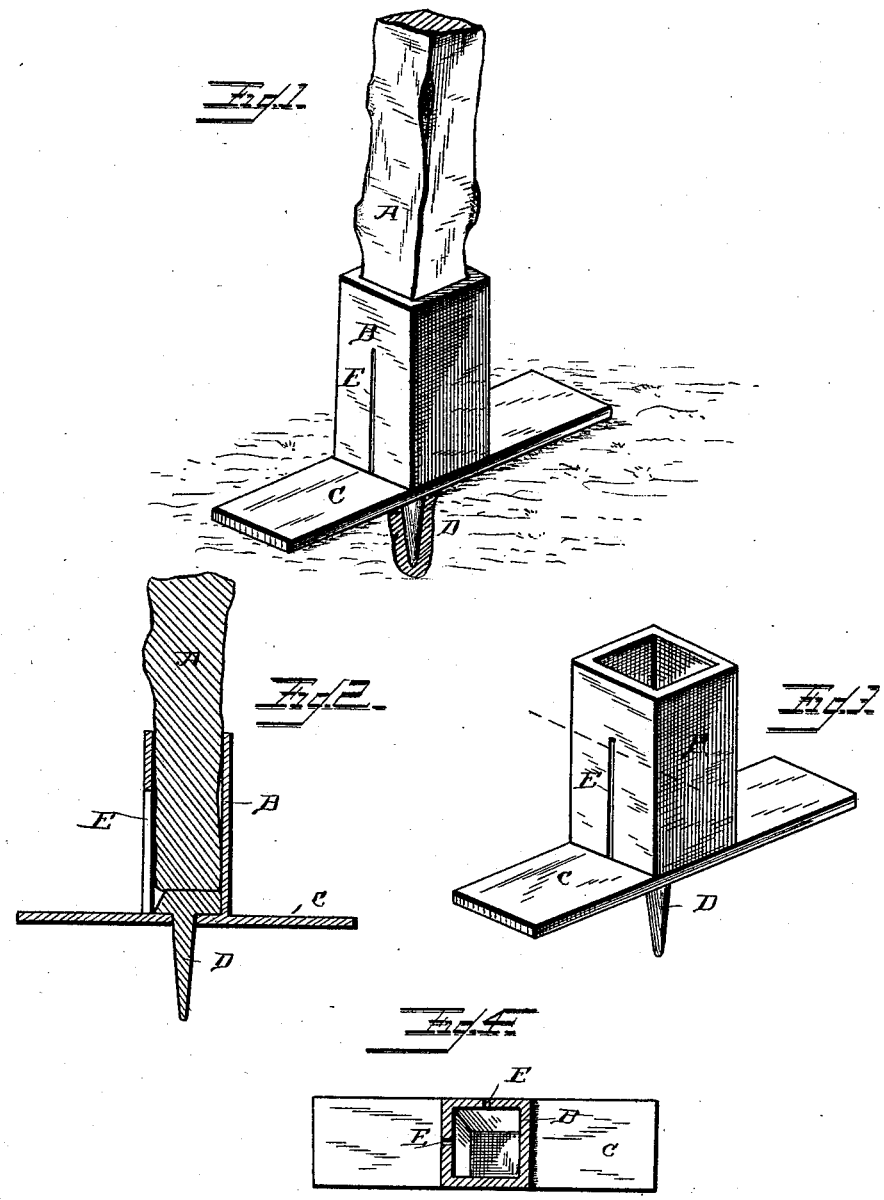
WITNESSES
William B. Thomas
INVENTOR
By Louis Bagger & Co
Attorneys.

UNITED STATES PATENT OFFICE.

WILLIAM B. THOMAS, OF GREEN CAMP, OHIO.

POST-HOLDER.

SPECIFICATION forming part of Letters Patent No. 349,240, dated September 14, 1886.

Application filed June 8, 1886. Serial No. 204,504. (No model.)

*To all whom it may concern:*

Be it known that WILLIAM B. THOMAS, a citizen of the United States, and a resident of Green Camp, in the county of Marion and State of Ohio, have invented certain new and useful Improvements in Fence-Post Holders; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of a fence-post provided with my improved post-holder. Fig. 2 is a vertical sectional view of the same. Fig. 3 is a perspective view of the holder; and Fig. 4 is a transverse sectional view on line *x x*, Fig. 2.

Similar letters of reference indicate corresponding parts in all the figures.

My invention has relation to that class of holders for fence-posts in which a socket for the reception of the lower end of the post is provided with a spike or bar at its lower end for entering the ground, and a plate for bracing the socket; and it consists in the improved construction and combination of parts of such a holder, as hereinafter more fully described and shown.

Heretofore fence-posts of this class have not been provided with the means for permitting the water to pass out of the cup at the base of the post, and still have the other desirable features necessary to make it substantial; hence it has been my object to produce a post-holder that will be simple, durable, and effective.

In the accompanying drawings, the letter A indicates the post, the lower end of which is fitted into a socket, B, which is preferably square, as shown in the drawings, although it may be round, or of any other suitable shape, according to the shape of the post, and this socket is secured at the middle of a long plate, C, of the same width as the socket, and has a downwardly-projecting plug or bar, D, projecting below the plate. The sides of the socket are formed with longitudinal slots E, extending from the lower end of the socket to near the upper end, the slots being either in one side or in more than one side. The spike D is formed with a flat head, which is beveled on one or more of its upper edges, as shown in Figs. 2 and 4. Said head forms a false bottom for the socket, and its beveled edges provide for a ready escape of water from said bottom through the slots in the sides of the socket.

In setting fence the plate, with its superimposed socket, is located, and then the spike is dropped into the socket, its shank passing through a hole made in the plate for the same, and driven into the ground till its head rests upon said plate. The driving of the spike may be done by any suitable tool, or said spike may be forced into place by the post itself as the latter is driven into its socket. It will be seen that when one post is rendered unfit for use by rot or other causes the post may be removed and another post inserted, the socket and its plate and spike remaining in their former positions. The plate may be placed longitudinally or transversely to the line of the fence, so that the fence may be built in a vertical plane upon a hillside, the plates being placed longitudinal to the line of fence, while upon flat land the plates may be placed transversely to the line, affording more resistance to any force brought to bear against the fence. The lower boards or rails of the fence may be nailed to the post by inserting the nails through the slots in the sockets; or, in wire fences, the staples which secure the wires may be inserted through the slots and hammered into the posts in the usual manner.

In constructing a fence with these sockets there is no necessity for digging post-holes, as the spikes of the sockets may be forced into the ground without digging any holes for them, and a saving in lumber for the posts may be effected, as the posts need only be of the length which is desired above the surface of the ground, there being no part of the post to go into the ground. In this manner the socket will effect a saving in material and labor in putting up the fence, and the repairing of the fence may be carried out with less labor than in fences having their posts secured in holes in the ground, as it is only necessary to remove the post from the socket and replace it with another without any digging or other securing.

Having thus described my invention, I claim and desire to secure by Letters Patent of the United States—

The herein-described post-holder, comprising the long plate C, and the socket B, of the same width as said plate, located at the middle thereof, and provided with the longitudinal slots E, in combination with the removable spike D, having a flat beveled head, substantially as described.

In testimony that I claim the foregoing as my own I have hereunto affixed my signature in presence of two witnesses.

WILLIAM B. THOMAS.

Witnesses:
J. E. DAVIDS,
B. WADDEL.